United States Patent [19]

Kikitsu et al.

[11] Patent Number: 5,175,714
[45] Date of Patent: Dec. 29, 1992

[54] METHOD OF MAGNETO-OPTICALLY RECORDING/ERASING INFORMATION AND MAGNETO-OPTICAL INFORMATION STORAGE MEDIUM INCLUDING RECORDING AND BIAS LAYERS SATISFYING CERTAIN CONDITIONS

[75] Inventors: Akira Kikitsu, Yokohama; Katsutarou Ichihara; Sumio Ashida, both of Tokyo, all of Japan

[73] Assignee: Kabushiki Kaisha Toshiba, Kawasaki, Japan

[21] Appl. No.: 413,485

[22] Filed: Sep. 27, 1989

[30] Foreign Application Priority Data

Sep. 30, 1988 [JP] Japan .................. 63-243809

[51] Int. Cl.⁵ ............... G11B 13/04; G11B 11/14
[52] U.S. Cl. .................. 369/13; 360/59; 360/114; 365/122; 428/694
[58] Field of Search .............. 369/13; 360/59, 114; 365/122; 428/694, 900

[56] References Cited

U.S. PATENT DOCUMENTS

| 4,649,519 | 3/1987 | Sun et al. | 365/122 X |
| 4,751,142 | 6/1988 | Arimune et al. | 428/336 |
| 4,771,347 | 9/1988 | Horimai et al. | 360/59 |
| 4,794,560 | 12/1988 | Bell et al. | 369/13 X |
| 4,855,975 | 8/1989 | Akasaka et al. | 360/114 |

FOREIGN PATENT DOCUMENTS

| 304288 | 2/1989 | European Pat. Off. . |
| 62-175948 | 1/1987 | Japan . |
| 62-154347 | 9/1987 | Japan . |
| 63-179435 | 7/1988 | Japan . |

Primary Examiner—Hoa Nguyen
Attorney, Agent, or Firm—Oblon, Spivak, McClelland, Maier & Neustadt

[57] ABSTRACT

A magneto-optical recording medium including a recording layer and a bias layer being stacked one upon the other to apply coupling interaction which is mainly magnetostatic interaction to each other, the bias layer having a magnetization-reversing temperature higher than that of the recording layer. The medium is irradiated with laser beam pulses having a recording level and an erasing level lower than the recording level, thereby recording and erasing the information. When the medium is irradiated with the laser beam pulse having the recording level and the irradiated region is cooled to the magnetization reversing temperature $T_{rR}$, the magnetization of the beam-irradiated region of the recording layer is aligned with a direction of the leakage magnetic field leaking from the recording layer. When the medium is irradiated with the laser beam pulse having the erase level and the irradiated region is cooled to $T_{rR}$, direction of magnetization of the beam-irradiated region of the recording layer is aligned with a direction of the leakage magnetic field applied from the bias layer to the recording layer.

10 Claims, 5 Drawing Sheets

TEMPERATURE

FIG. 6A    Ta

FIG. 6B   T2(≃TrR)

FIG. 8B  T2(≃TrR)

METHOD OF MAGNETO-OPTICALLY RECORDING/ERASING INFORMATION AND MAGNETO-OPTICAL INFORMATION STORAGE MEDIUM INCLUDING RECORDING AND BIAS LAYERS SATISFYING CERTAIN CONDITIONS

BACKGROUND OF THE INVENTION

1. Field of the Invention

The present invention relates to a method of magneto-optically recording erasing information subjected to overwrite access and a magneto-optical information storage medium which employs the method.

2. Description of the Related Art

A thin film made of rare earth-transition metal amorphous alloys (to be referred to a-RE-TM hereinafter) such as TbFe, TbCo, TbFeCo, GdTbFe, GdTbFeCo has an easy magnetization axis in a direction perpendicular to its surfaces. Magnetic properties of this film changes in accordance with temperature. Magneto-optical recording utilizes the above properties. More specifically, a recording layer made of an a-RE-TM is irradiated with a laser beam, and the temperature of the recording layer is increased to decrease its coercive force to a level lower than an external magnetic field. A small reversed-magnetic domain is formed in this portion by the external magnetic field, thereby recording information. The small reversed-magnetic domain is caused to disappear to erase information. In this manner, information is reproduced by using a magneto-optical effect such as polar Kerr-rotation. Magneto-optical recording has advantages in non-contact accessibility, compatibility of media, and a high recording density, which are common advantages in optical recording. However, magneto-optical recording has a disadvantage in overwriting as compared with magnetic recording.

Various types of overwriting techniques in magneto-optical recording have been proposed. The most attractive one of them is of the light modulation and one beam type (which is called one beam method).

The one-beam method is described in Published Unexamined Japanese Patent Application No. Sho 62-175948. In this publication, an initial auxiliary magnetic field is applied to a magneto-optical recording medium having a recording/reproducing layer and an auxiliary recording layer to align the direction of magnetization of the auxiliary recording layer in a predetermined direction. The magneto-optical recording medium is irradiated with a modulated beam pulse. When a beam intensity is high, a bit having one direction of magnetization is formed. However, when the beam intensity is low, a bit having the other direction of magnetization is formed.

According to this technique, since the recording/reproducing layer is exchange-coupled with the auxiliary recording layer, the exchange coupling force which is must be controlled to have a specified magnitude with respect to a coercive force of each layer which changes with a change in temperature. Therefore, it is difficult to manufacture the medium. In addition, prior to overwrite operation, the direction of magnetization of the auxiliary recording layer must be aligned in a predetermined direct ion. For this purpose, the initial-magnetizing magnet for applying a magnetic field of several kOe must be large in size, thus posing technical problems.

Another conventional technique disclosed in Published Unexamined Japanese Patent Application No. Sho 62-154347 is related to a medium obtained by stacking a recording layer and a bias layer having a compensation point, in which a nonmagnetic layer having a magnetical insulation property is interposed therebetween. According to this technique, the medium is designed such that the bias layer has different temperatures in the write and erase modes. The bias layer must be designed to differentiate the directions of saturated magnetization Ms of the bias layer at those two different temperatures. Therefore, it is difficult to manufacture such a medium.

The light-modulated one-beam method has received a great deal of attention as an overwrite technique in magneto-optical recording. However, in this method, it is difficult to manufacture a medium and the structure of the medium is complicated. Therefore, no practical magneto-optical recording method using this technique has been proposed.

SUMMARY OF THE INVENTION

The present invention is therefore intended to eliminate the above-mentioned drawbacks and its object is to provide a method of magneto-optically recording/erasing information, which can practically make the one-beam-power-modulated overwriting by way of a light modulation scheme, and also to provide a magneto-optical information storage medium used in this method.

According to an aspect of the present invention, there is provided a method of recording/erasing information which comprises irradiating pulse-like laser beam onto a magneto-optical information storage medium, the power of said laser beam being modulated into a first level and a second level lower than the first level, said magneto-optical information storage medium including recording and bias layers which are stacked one upon the other to apply coupling interaction which is mainly magnetostatic interaction to each other the medium satisfying condition $T_1 > T_2 > T_{rR}$, where $T_{rR}$ is a magnetization-reversing temperature of the recording layer, $T_1$ is a temperature of a region irradiated with the laser beam having the first power level, and $T_2$ is a temperature of a region irradiated with the laser beam having the second power level, and said medium satisfying condition $H_{CR}(T_{rR}) \leq H_{S1} - H_{B1}$ (where $H_{B1}$ is a leakage magnetic field leaking from the bias layer and applied to the recording layer and $H_{S1}$ is a self-leakage magnetic field leaking from the recording layer, both $H_{B1}$ and $H_{S1}$ being values obtained when the medium is cooled from the temperature $T_1$ to the temperature $T_{rR}$, and $H_{CR}(T_{rR})$ is a coercive force of the recording layer at the temperature $T_{rR}$) when the recording and bias layers are cooled from the temperature $T_1$ to the temperature $T_{rR}$, and condition $H_{CR}(T_{rR}) \leq H_{B2} - H_{S2}$ (where $H_{B2}$ is a leakage magnetic field leaking from the bias layer and applied to the recording layer and $H_{S2}$ is a self-leakage magnetic field leaking from the recording layer, both $H_{B2}$ and $H_{S2}$ being values obtained when the medium is cooled from the temperature $T_2$ to the temperature $T_{rR}$, and $H_{CR}(T_{rR})$ is a coercive force of the recording layer at the temperature $T_{rR}$) when the recording and bias layers are cooled from the temperature $T_2$ to the temperature $T_{rR}$;

wherein when the medium is irradiated with the laser beam pulse having the first level and the irradiated region is cooled from the temperature $T_1$ to $T_{rR}$, the magnetization of the beam-irradiated region of the recording layer is directed to a direction of the leakage magnetic field leaking from the recording layer, and when the medium is irradiated with the laser beam pulse having the second power level and the irradiated region is cooled from the temperature $T_2$ to the temperature $T_{rR}$ the magnetization of the beam-irradiated region of the recording layer is directed a direction of the leakage magnetic field applied from the bias layer to the recording layer.

According to another aspect of the present invention, there is provided a magneto-optical information storage medium comprising a recording layer for recording information and a bias layer for applying a bias magnetic field to the recording layer, the recording and bias layers having perpendicular magnetic anisotropy and being stacked one upon the other to apply coupling interaction which is mainly magnetostatic interaction to each other, the medium being irradiated with modulated laser beam pulses having a first level and a second level lower than the first level so a to record/erase the information, wherein the medium satisfies condition $T_1 > T_2 > T_{rR}$ where $T_{rR}$ is a magnetization-reversing temperature of the recording layer, $T_1$ is a temperature of a region irradiated with the laser beam having the first power level, and $T_2$ is a temperature of a region irradiated with the laser beam having the second power level, and satisfies condition $H_{CR}(T_{rR}) \leq H_{S1} - H_{B1}$ (where $H_{B1}$ is a leakage magnetic field leaking from the bias layer and applied to the recording layer and $H_{S1}$ is a self-leakage magnetic field leaking from the recording layer, both $H_{B1}$ and $H_{S1}$ being values obtained when the medium is cooled from the temperature $T_1$ to the temperature $T_{rR}$, and $H_{CR}(T_{rR})$ is a coercive force of the recording layer at the temperature $T_{rR}$) when the recording and bias layers are cooled from the temperature $T_1$ to the temperature $T_{rR}$, and condition $H_{CR}(T_{rR}) \leq H_{B2} - H_{S2}$ (where $H_{B2}$ is a leakage magnetic field leaking from the bias layer and applied to the recording layer and $H_{S2}$ is a self leakage magnetic field leaking from the recording layer, both $H_{B2}$ and $H_{S2}$ being values obtained when the medium is cooled from the temperature $T_2$ to the temperature $T_{rR}$, and $H_{CR}(T_{rR})$ is a coercive force of the recording layer at the temperature $T_{rR}$) when the recording and bias layers are cooled from the temperature $T_2$ to the temperature $T_{rR}$.

According to still another aspect of the present invention, there is provided a magneto-optical recording medium comprising a recording layer for recording information and a bias layer for applying a bias magnetic field to the recording layer, the recording and bias layers having perpendicular magnetic anisotropy and being stacked one upon the other to apply coupling interaction which is mainly magnetostatic interaction to each other, the recording layer containing an alloy represented by formula $(Gd_xDy_{1-x})_yFe_{1-y}$ (wherein x and y are expressed in at % and satisfy $0 < x < 100$ and $13 < y < 35$).

An intermediate layer consisting of a dielectric material can be formed between the recording and bias layer to eliminate an exchange coupling force acting therebetween.

When the magneto-optical recording medium is irradiated with laser beam modulated two levels as described above, the magnitudes of the magnetic field leaking from the recording layer and the magnetic field leaking from the bias layer to the recording layer are determined such that the direction of magnetization of a recording layer portion irradiated with the laser beam having the high power and cooled to the magnetization-reversing inversion temperature is opposed to that irradiated with the beam pulse having the low power and cooled to the magnetization-reversing temperature. Therefore, a practical one-beam power modulation overwrite operation can be performed.

DETAILED DESCRIPTION OF THE PREFERRED EMBODIMENTS

Figure 1:
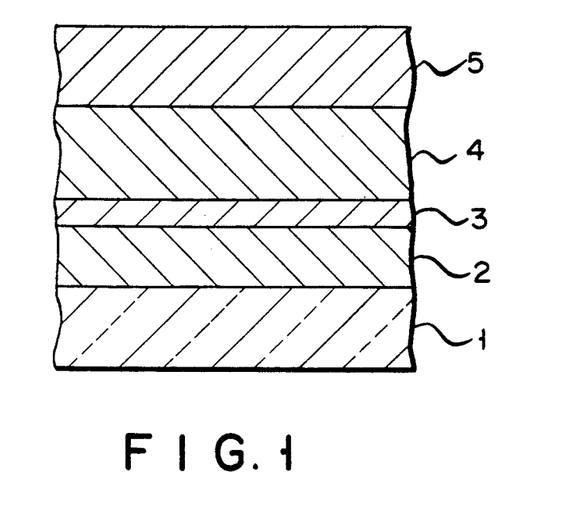
FIG. 1 is a sectional view of a magneto-optical information storage medium according to an embodiment of the present invention.

Preferred embodiments of the present invention will be described in detail with reference to the accompanying drawings. FIG. 1 is a sectional view of a magneto-optical information storage medium which employs a recording/erasing method according to an embodiment of the present invention. Reference numeral 1 denotes a substrate made of glass or a transparent resin. A recording layer 2, an intermediate layer 3, a bias layer 4, and a protective layer 5 are sequentially stacked on the substrate 1. These layers are preferably formed by thin-film formation techniques such as sputtering.

The recording and bias layers 2 and 4 have axes of easy magnetization perpendicular to their surfaces and are made of an a-RE-TM alloy such as TbFe, TbCo, TbFeCo, GdTbFe, GdTbFeCo, or GdTbCo.

According to the present invention, magnetization-reversal of the recording layer 2 is not performed by an exchange coupling force from the bias layer but by leakage magnetic fields leaking from both the layers and an application of an external magnetic field, if needed.

These layers are stacked to mainly cause magnetostatic coupling so as to prevent the exchange coupling force. Even if the exchange coupling force acts on the medium, the exchange coupling force is preferably set to be a value very smaller than the magnitude of the bias magnetic field.

The intermediate layer 3 is formed to shield the exchange coupling force and preferably made of a dielectric material such as Si-N, Si-O, or Zr-O. If the exchange coupling force is sufficiently small, the intermediate layer 3 ca be omitted.

When the intermediate layer 3 is formed, its thickness is not limited to a specific value. The thickness can be appropriately determined in consideration of Kerr enhancement in the read mode, absorption efficiency of the laser beam and thermal diffusion, depending on types of material. The thickness is preferably 2,000 Å or less. In order to eliminate the exchange coupling force between the recording layer 2 and the bias layer 4, the thickness of the intermediate layer 3 is sufficiently several Å, and is preferably small enough to sufficiently apply the leakage magnetic field from the bias layer 4 to the recording layer 2, and is preferably small enough to heat the bias layer to the temperature $T_1$ during laser beam radiation. From these points of view, the thickness preferably falls within the range of 5 to 500 Å. The intermediate layer 3 may be opaque since the bias layer 4 does not contribute to the reproduced signal from the beginning and it has only to conduct heat upon laser beam radiation.

The thickness of the bias layer 4 is preferably large enough to sufficiently apply the leakage magnetic field to the recording layer and is also preferably small enough to allow heating of the bias layer 4 to the temperature $T_1$ upon laser beam radiation. From these points of view, the thickness of the bias layer 4 preferably falls within the range of 250 to 5,000 Å and more preferably 1,000 to 3,000 Å.

The thickness of the recording layer 2 is preferably large enough to apply a sufficiently high leakage magnetic field to itself and is also preferably small enough to be heated to the temperature $T_1$ and to sufficiently heat the bias layer during laser beam radiation. From these points of view, the thickness of the recording layer 2 preferably falls within the range of 100 to 5,000 Å and more preferably 150 to 1,500 Å.

In the formation of the recording and bias layers 2 and 4 by the thin-film formation techniques such as sputtering, it is difficult to form films having sufficient perpendicular magnetic anisotropy when the film thickness is less than 100 Å.

The protective layer 5 made of, e.g., a dielectric material and has a function to protect the recording and bias layers 2 and 4. The protective layer 5 is preferably formed but need not be formed.

Figure 2:
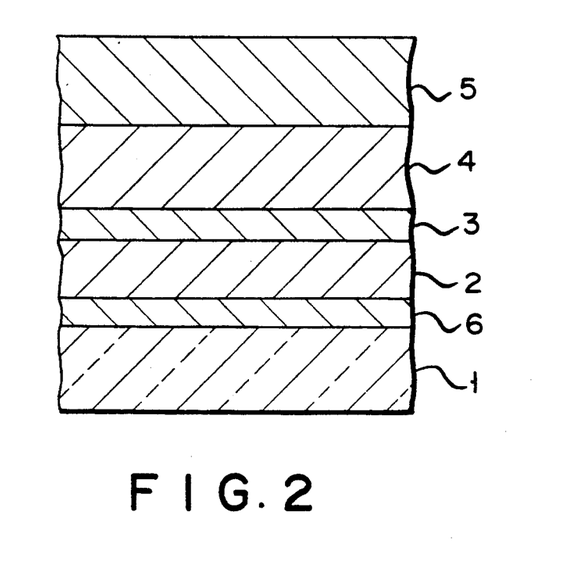
FIG. 2 is a sectional view of a magneto-optical information storage medium according to another embodiment of the present invention.

An underlaying layer 6 may be formed between a substrate 1 and a recording layer 2, as shown in FIG. 2.

This magneto-optical information storage medium is irradiated with pulse-like laser beam power-modulated into a first beam power level (recording level) and a second level (erase level) lower than the first level, in accordance with information to be recorded, thereby recording and erasing the information.

The recording layer 2 has a magnetization reversal temperature. The medium satisfies inequality $T_1 > T_2 > T_{rR}$ where $T_{rR}$ is the magnetization-reversing temperature of the recording layer, $T_1$ is the temperature of a region irradiated with the laser beam having the first level, and $T_2$ is the temperature of a region irradiated with the laser beam having the second level.

Preferably, the temperatures $T_1$ and $T_2$ fall within a range of temperatures to which the recording layer 2 can be heated when irradiated with a beam emitted from a semiconductor laser of the ordinary type whose maximum output power is about 15 mW.

The medium also satisfies inequality $H_{CR}(T_{rR}) \leq H_{S1} - H_{B1}$ (where $H_{B1}$ is the leakage magnetic field leaking from the bias layer and applied to the recording layer and $H_{S1}$ is the self-leakage magnetic field leaking from the recording layer, both $H_{B1}$ and $H_{S1}$ being values obtained when the medium is cooled from the temperature $T_1$ to the temperature $T_{rR}$, and $H_{CR}(T_{rR})$ is the coercive force of the recording layer at the temperature $T_{rR}$) when the recording and bias layers are cooled from the temperature $T_1$ to the temperature $T_{rR}$, and inequality $H_{CR}(T_{rR}) \leq H_{B2} - H_{S2}$ (where $H_{B2}$ is the leakage magnetic field leaking from the bias layer and applied to the recording layer and $H_{S2}$ is the self-leakage magnetic field leaking from the recording layer, both $H_{B2}$ and $H_{S2}$ being values obtained when the medium is cooled from the temperature $T_2$ to the temperature $T_{rR}$, and $H_{CR}(T_{rR})$ is the coercive force of the recording layer at the temperature $T_{rR}$) when the recording and bias layers are cooled from the temperature $T_2$ to the temperature $T_{rR}$.

The magnetization-reversing temperature is defined as a temperature at which a coercive force $H_{CR}$ of the recording layer 2 is smaller than the magnitude of the leakage magnetic field to form an reversed magnetic domain.

Magnetization-reversal preferably does not occur in the bias layer 4. In order to prevent magnetization-reversal, the bias layer 4 must always satisfy inequality $H_{CB} > H_E$ where $H_{CB}$ is the coercive force of the bias layer 4 and $H_E$ is a component of perpendicular to the surface of the sum of vectors of the leakage magnetic field leaking from the bias layer 4 and the leakage magnetic field leaking from the recording layer 2 to the bias layer 4. If magnetization-reversal occurs in the bias layer 4, inequality $T_{rB} > T_1 > T_2 T_{rR}$ must be satisfied where $T_{rB}$ is the magnetization-reversing temperature.

The bias layer 4 may or may not have a compensation temperature but preferably has a compensation temperature $T_{compB}$ which satisfies $T_{rR} > T_{compB}$ so as to cause the bias layer 4 to apply a sufficiently high leakage magnetic field to the recording layer 2.

The recording layer 2 may or may not have a compensation temperature, either. However, when the recording layer 2 has a Curie temperature about $T_{rR}$, it is preferable not to cause a compensation temperature $T_{compR}$ to fall between room temperature and the Curie temperature. When the compensation temperature $T_{compR}$ falls between room temperature and the Curie temperature, it is preferable that $T_{rR} > T_{compR}$ is satisfied.

In order to enlarge the change between $H_{B1}$ and $H_{B2}$ both of which are the leakage magnetic fields from the bias layer 4, and between $H_S$ and $H_{S2}$ both of which are the leakage magnetic fields from the recording layer, a full width at half maxima (to be referred to as FWHM hereinafter) $T_{HW1}$ of a temperature distribution measured at a beam irradiated portion upon a decrease from the temperature $T_1$ to the temperature $T_{rR}$, and a FWHM $T_{HW2}$ of a temperature distribution measured at the beam irradiated portion upon a decrease from the temperature $T_2$ to the temperature $T_{rR}$ preferably satisfy condition $T_{HW1}/T_{HW2} > 2$.

An external magnetic field $H_{e1}$ which satisfies conditions $H_{CR}(T_{rR}) \leq H_{S1} + H_{e1} - H_{B1}$ and $H_{CR}(T_{rR}) \leq H_{B2} - (H_{S2} + H_{e1})$ may be applied in the directions of the leakage magnetic fields $H_{S1}$ and $H_{S2}$ from the recording layer 2 in order to compensate for them, if necessary. An external magnetic field $H_{e2}$ which satisfies conditions $H_{CR}(T_{rR}) \leq H_{S1} - (H_{B1} + H_{e2})$ and $H_{CR}(T_{rR}) \leq H_{B2} + H_{e2} - H_{S2}$ may be applied to the directions of leakage magnetic fields $H_{B1}$ and $H_{B2}$ from the bias layer 4 in order to compensate for them. The external magnetic field may be constantly applied to the medium during laser beam radiation. Alternatively, the external magnetic field may be applied to the medium when the medium temperature reaches the magnetization-reversing temperature $T_{rR}$ of the recording layer 2.

When a value of $H_{B1} - H_{B2}$ is not sufficiently large, it is preferable to change a C/N ratio in a reproduced signal from zero to a saturation level with a small change in magnetic field in the recording layer 2. For this purpose, a Gd-Dy-Fe alloy is effective (11th Meeting of the Institute of Japanese Applied Magnetics, Lecture Papers (1987. 11), P. 276). In general, condition $H_{B1} - H_{B2}$ 200 Oe can be easily achieved. Therefore, it is preferable that a material capable of achieving a saturated C/N ratio with a change in magnetic field of 150 Oe or less is used in the recording layer 2.

When the recording layer 2 made of an alloy represented by formula $(Gd_xDy_{1-x})_yFe_{1-y}$ (wherein x and y are represented in at % and satisfy conditions $0 < x < 100$ and $13 < y < 35$), a C/N ratio in a reproduced signal can reach a saturation level with small magnetic field to satisfy the above condition. When the recording layer 2 made of such a material, recording/erasure of information utilizing the leakage magnetic fields disclosed in the present invention can be facilitated.

Figure 3A:
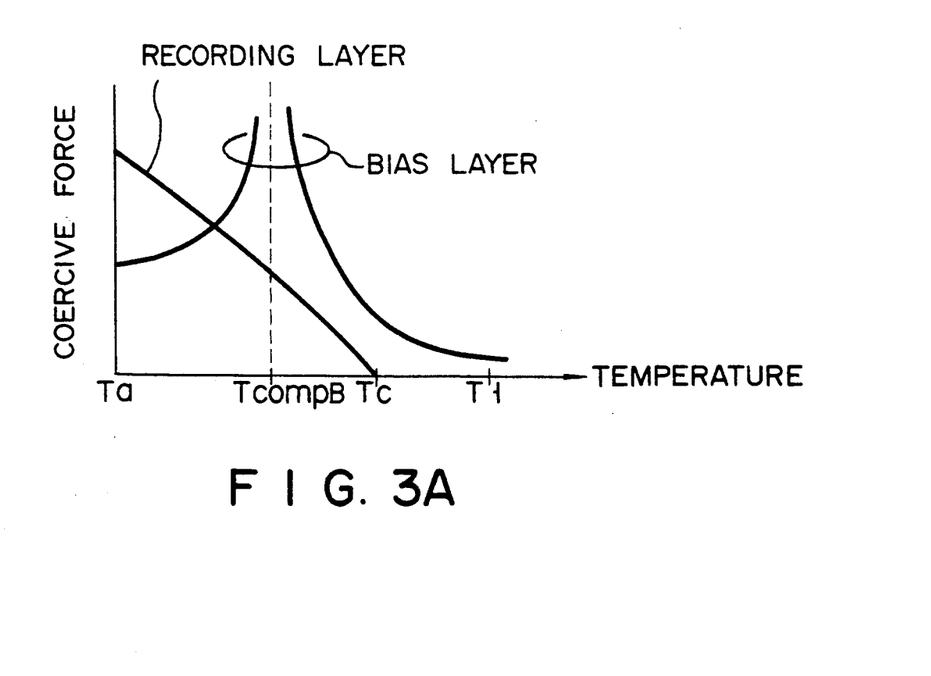
FIG. 3A is a graph showing a relationship between the temperature and the coercive force of recording and bias layers of the medium shown in FIG. 1.
Figure 3B:
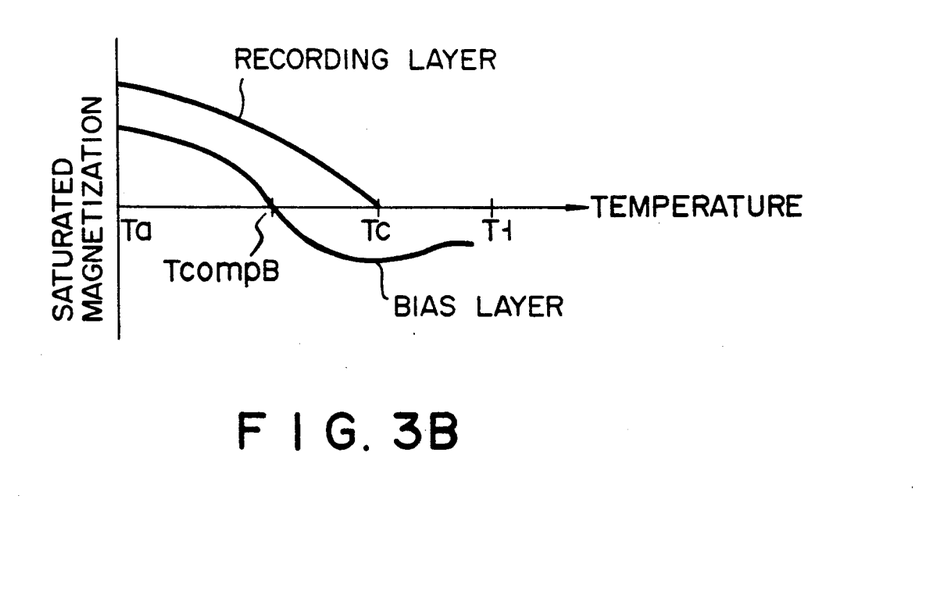
FIG. 3B is a graph showing a relationship between the temperature and saturated magnetization of the recording and bias layers of the medium shown in FIG. 1.

The principle of recording/erasure of information according to the present invention will be described by the use of a magneto-optical information storage medium which has a recording medium 2 and a bias layer 4 whose temperature-magnetic characteristic curves are shown in FIGS. 3A and 3B.

FIG. 3A shows the relationship between the temperatures and the coercive forces of the recording and bias layers 2 and 4, and FIG. 3B shows the relationship between the temperatures and saturated magnetization of the recording layer 2 and the bias layer 4. Referring to FIGS. 3A and 3B, reference symbol $T_a$ denotes a holding temperature; $T_{compB}$, a compensation temperature (i.e., a temperature at which the direction of magnetization is inverted) of the bias layer; $T_C$, a Curie temperature of the recording layer; and $T_1$, a temperature of an irradiated portion when the medium is irradiated with the laser beam having the first power level (recording level). The temperature $T_2$ of the medium portion irradiated with the second power level (erasure level) and the magnetization-reversing temperature $T_{rR}$ of the recording layer 2 are almost equal to the temperature $T_C$.

The bias layer 4 always satisfies condition $|\vec{H}_S + \vec{H}_E| < \vec{H}_{CB}$ where $\vec{H}_S$ is the leakage magnetic field vector (self leakage magnetic field vector) from the bias layer 4 to itself, $H_E$ is the leakage magnetic field vector applied from the recording layer 2 to the bias layer 4, and $H_{CB}$ is the coercive force of the bias layer 4. In this case, the magnetization-reversal does not occur in the bias layer 4. Even if the external magnetic field $\vec{H}_e$ is applied, condition $|\vec{H}_S + \vec{H}_E + \vec{H}_e| < H_{CB}$ should be satisfied, and no magnetic reversal occurs in the bias layer 4.

An operation for recording information will be described below.

FIGS. 4A to 4E are views showing directions of magnetization of the recording and bias layers having the above temperature-magnetic characteristic curves during recording in units of temperatures. In FIGS. 4A to 4E, only the recording layer and the bias layers are described which are extracted from the magneto-optical information storage medium and are illustrated. In FIGS. 4A to 4E, a portion having an reversed magnetic domain is represented by a vertical line.

Figure 4A:
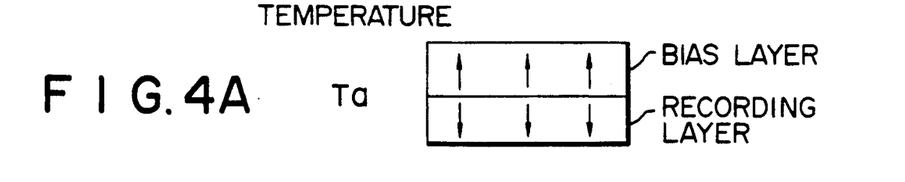
FIGS. 4A to 4E are views showing a relationship between the directions of magnetization and the temperatures of the recording and bias layers of the medium of FIG. 1 when the medium is irradiated with a laser beam having the first power level.

FIG. 4A shows an initial state corresponding to a non-recorded state. The direction of magnetization of the recording layer 2 is set opposite direction to that of the bias layer 4.

Figure 4B:
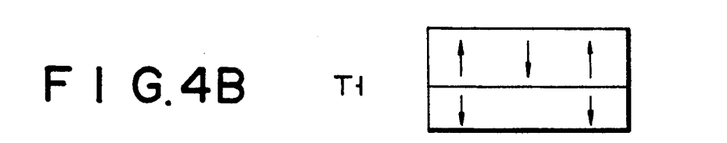

When the medium is irradiated with a laser beam having the first level, the temperature of the irradiated portion is increased to the temperature $T_1$, so that a state shown in FIG. 4B is obtained. That is, a state in which magnetization of the beam-irradiated portion of the recording layer 2 disappears is obtained.

Figure 4C:
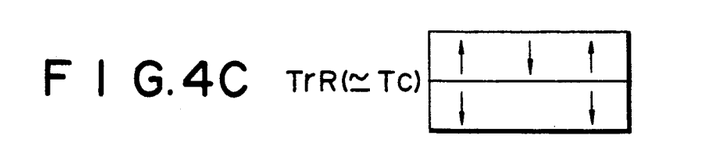
Figure 4D:
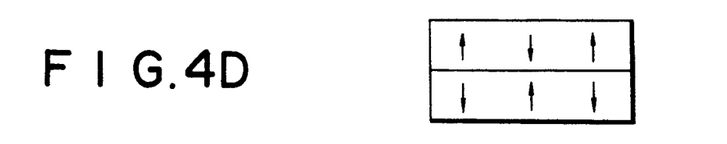
Figure 5:
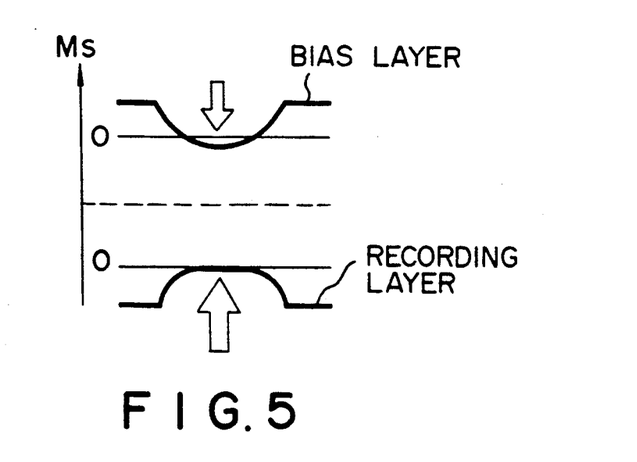
FIG. 5 is a view showing a magnetization distribution of beam irradiated portions of the recording and bias layers in the magnetization state shown in FIG. 4C.

Upon laser beam radiation, when the medium is cooled to the temperature $T_{rR}$ ($\simeq T_C$), the state of magnetization is as shown in FIG. 4C. In this case the magnetization distribution of the beam irradiated portions of the recording and bias layers 2 and 4 is given as shown in FIG. 5. The magnetization distribution of the bias layer 4 is broad due to thermal diffusion. Therefore, the leakage magnetic field applied from the bias layer 4 to the recording layer 2 is not large enough to prevent magnetization-reversal of the recording layer which is caused by the self-leakage magnetic field leaking from the recording layer 2 and applied thereto. Therefore, magnetization-reversal of the recording layer 2 occurs by the self-leakage magnetic field of the recording layer 2, thereby forming a reversed magnetic domain, as shown in FIG. 4D.

Figure 4E:
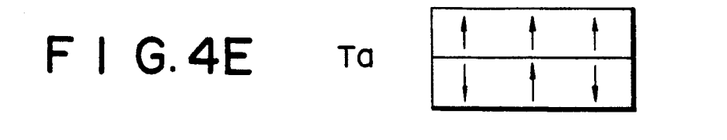

The medium is cooled to room temperature while this magnetization state is maintained, thereby obtaining a recorded state shown in FIG. 4E.

An operation for erasing the recorded information will be described below.

FIGS. 6A to 6D are views showing directions of magnetization of the recording and bias layers during erasure.

Figure 6A:
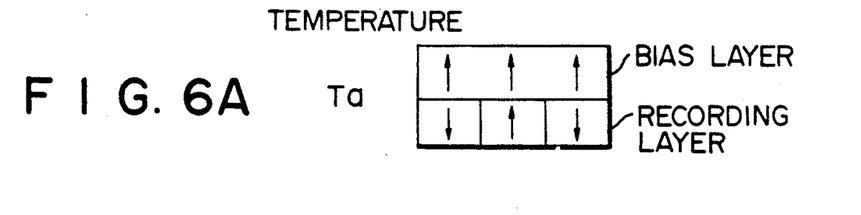
FIGS. 6A to 6D are views showing a relationship between the directions of magnetization and the temperatures of the recording and bias layers of the medium shown in FIG. 1 when the medium is irradiated with a laser beam having the second power level.
Figure 6B:
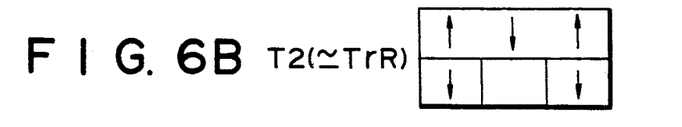
Figure 6C:
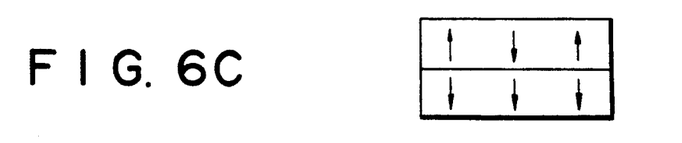
Figure 7:
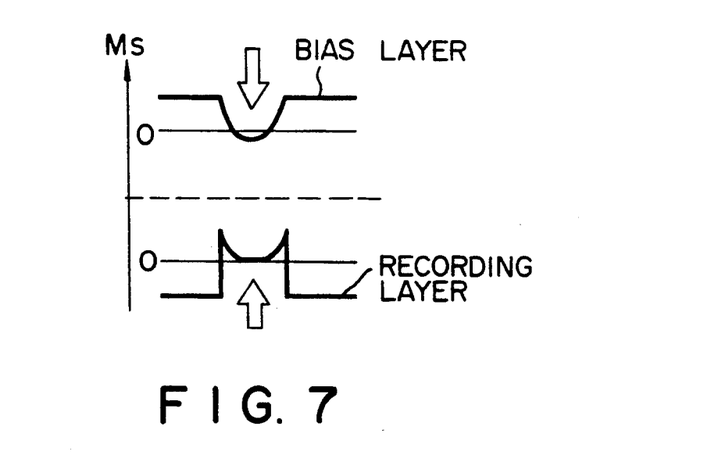
FIG. 7 is a view showing a magnetization distribution of beam irradiated portions of the recording and bias layers in the magnetization state shown in FIG. 6B.

When the medium in the recorded state shown in FIG. 6A is irradiated with a laser beam having the second power level (erasure level), the temperature of the irradiated portion is increased to the temperature $T_2$. The temperature $T_2$ is almost equal to the magnetization reversing temperature $T_{rR}$ of the recording layer and is higher than the compensation temperature $T_{compB}$ of the bias layer 4. Therefore, when the temperature of the irradiated portion reaches the temperature $T_2$, the magnetization of the recording layer 2 disappears, as shown in FIG. 6B. In this case, the magnetization distribution of the beam-irradiated portions of the recording and bias layers 2 and 4 is sharper than the case of the recording process (FIG. 5), as shown in FIG. 7. The magnitude of the leakage magnetic field applied from the bias layer 4 to the recording layer 2 is large enough to cause magnetization-re-reversal of the beam-irradiated portion of the recording layer 2. Therefore, as shown in FIG. 6C, magnetization of the recording layer 2 is re-reversed, and the reversed magnetic domain disappears.

Figure 6D:
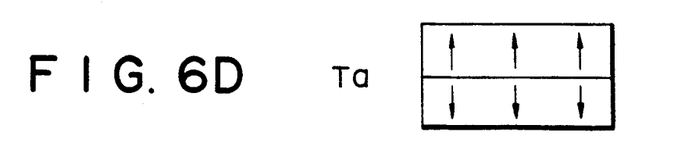

After cooling the medium to room temperature, an erased state shown in FIG. 6D is obtained.

Figure 8A:
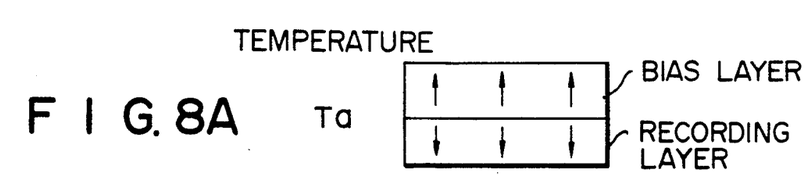
FIGS. 8A to 8C are views showing a magnetization distribution of irradiated portions of the recording and bias layers when a nonrecorded portion of the medium is irradiated with the laser beam having the second power level.
Figure 8B:
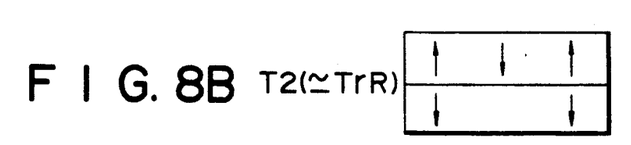
Figure 8C:
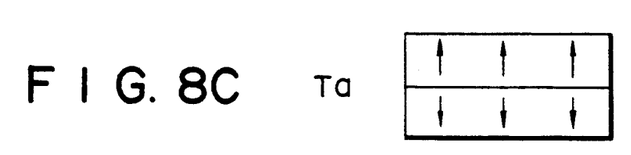

When a portion without a reversed magnetic domain is irradiated with a laser beam having the second power level (erasure level), the reversed magnetic domain is not formed in the beam-irradiated portion, as shown in FIGS. 8A to 8C, due to the following reason.

Figure 9:
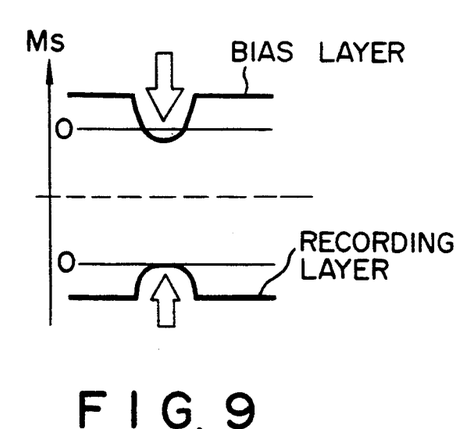
FIG. 9 is a view showing a magnetization distribution of beam irradiated portions of the recording and bias layers in a magnetization state shown in FIG. 8B.

When the medium in the initial state shown in FIG. 8A is irradiated with an erasing laser beam, a magnetization state is shown in FIG. 8B. The magnetic distribution of the beam-irradiated portions of the recording and bias layers 2 and 4 is given as shown in FIG. 9. The magnetization distribution of the irradiated portion of the bias layer 4 has a sharp profile as in FIG. 7. The magnitude of the leakage magnetic field applied from the bias layer 4 to the recording layer 2 is large. For this reason, a condition for forming a reversed magnetic domain in the recording layer 2 is not satisfied. Therefore, when the medium is cooled to room temperature, the reversed magnetic domain is not formed in the recording layer and the erased state is maintained, as shown in FIG. 8C.

In this manner, even if the nonrecorded portion is irradiated with the laser beam having the second power level, the reversed magnetic domain is not formed. Therefore, by combining the recording and erasing operations described above, direct overwrite can be performed. That is, when the medium is irradiated with a laser beam obtained by superposing the first level modulated by a recording signal on the second level, new information can be recorded while any previous information is being erased.

Once the erased state is obtained, the above process is repeated even if the medium is repeatedly heated to the temperature $T_2$. It is not needed to read, prior to the information erasing operation, whether or not erasing power is added after once reading information recorded, as in the case of the flip-flop recording medium disclosed in Published Unexamined Japanese Patent Application No. Sho 62-80846.

In the above recording/erasing and overwrite operations, the direction of the magnetization of the bias layer during the magnetization-reversal in the recording layer is equal to that during magnetization-re-reversal in the recording layer. Therefore the contents of the present invention are different from the recording method and the recording medium disclosed in Published Unexamined Japanese Patent Application No. Sho 62-154347.

The principle of recording/erasing information according this embodiment has been described. Regardless of the recorded contents, the "recorded state" can be obtained with the laser beam having a high level, and the "erased state" can be obtained with the laser beam having a low level. That is, upon radiation of a laser beam power-modulated between the high and low levels in accordance with an information signal to be recorded, high-speed overwrite operation can be achieved. For this reason, a laser beam required to detect a recorded magnetic domain in the conventional high-speed overwrite operation of the medium having a bias layer need not be used. The high-speed overwrite operation can be performed with a simple arrangement of a one-head one-beam scheme, and an erasure margin is also sufficiently assured.

The external magnetic field He applied during recording may have the same magnitude as that applied during erasure, and the intensity of the magnetic field can be as small as about several hundreds of Oe. Therefore, the apparatus can be made compact, and a servo electromagnetic drive system in an optical head is not adversely affected.

The magneto-optical information storage medium of the present invention has advantages over the conventional overwrite medium: (1) the exchange coupling interaction which is hard to control is not utilized; (2) design of the medium is easy since a specific temperature relationship between the recording and bias layers need not be established, and the medium can be easily manufactured; (3) materials and compositions by which the bias and recording layer are formed can be selected from a wider group since there are small limitations as to the compensation and Curie temperatures.

Reproduction of information can be achieved by irradiating laser beam onto the medium and using the magneto-optical effects such as Kerr effect, as seen in the case of the conventional magneto-optical information storage medium. The power of reproducing laser may be so large as to allow temperature at the beam-irradiated part of the medium to rise to a value lower than $T_2$.

EXAMPLES

Examples of the present invention will be described below.

EXAMPLE 1

A 100-nm thick Si-N underlaying layer, a 25-nm thick $Tb_{30.6}(Fe_{0.95}Co_{0.95})_{69.4}$ recording layer, a 20-nm thick Si-N intermediate layer, a 200-nm thick $(Gd_{0.25}Tb_{0.75})_{22.7}Co_{77.3}$ bias layer, and a 100-nm thick Si-N protective layer were formed on a 1.2-mm thick quartz substrate by way of RF sputtering in the order named to prepare a magneto-optical information storage medium having a structure shown in FIG. 2.

The recording layer had a Curie temperature of 163° C., a coercive force of 6 kOe at room temperature, and magnetization of 160 emu/cc at room temperature. The bias layer had a compensation temperature of 140° C., a coercive force of 3.5 kOe at room temperature, and magnetization of 200 emu/cc at room temperature.

The medium was irradiated with a semiconductor laser having a wavelength of 830 nm to perform a recording/erasure test at a linear speed of 14 mm/sec. In this case, recording was performed using a beam pulse having a power of 5 mW and a pulse width of 100 nsec. Upon continuous radiation of a laser beam having a power of 3.5 mW on a recorded portion, a recorded signal could be erased.

EXAMPLE 2

A 140-nm thick Si-N underlaying layer, a 25-nm thick $Tb_{28}(Fe_{0.85}Co_{0.15})_{72}$ recording layer, a 20-nm thick Si-N intermediate layer, a 150-nm thick $(Gd_{0.25}Tb_{0.75})_{22.7}Co_{77.3}$ bias layer, and a 100-nm thick Si-N protective layer were formed on a tracking-grooved glass substrate having a diameter of 5.25 inch by way of RF sputtering in the order named to prepare a magneto-optical information storage medium having a structure shown in FIG. 2.

The recording layer had a Curie temperature of 180° C., a compensation temperature of 110° C., a coercive force of 7.3 kOe at room temperature, and magnetization of 170 emu/cc at room temperature. The bias layer had a compensation temperature of 130° C., a coercive force of 4.0 kOe at room temperature, and magnetization of 180 emu/cc at room temperature.

An overwrite test using one-beam power modulation was performed at a linear speed of 10 m/sec, a recording power of 8 mW, an erase power of 4.5 mW, and a pulse width of 100 nsec while an external magnetic field of 200 Oe was kept applied in a direction of a leakage magnetic field applied from the bias layer to the recording layer. In this test, a 2-MHz new recording signal was recorded in the medium in which a 1-MHz recording signal was recorded. As a result, the previous 1-MHz information was erased, and only the new 2-MHz information was recorded. That is, the one-beam overwrite operation could be confirmed.

EXAMPLE 3

A 100-nm thick Si-N underlaying layer, a 25-nm thick $Tb_{28}(Fe_{0.85}Co_{0.15})_{72}$ recording layer, a 50-nm thick Si-N intermediate layer, a 150-nm thick $(Gd_{0.25}Tb_{0.75})_{18.4}Co_{81.6}$ bias layer, and a 100-nm thick Si-N protective layer were formed on a tracking-grooved glass substrate having a diameter of 5.25 inch by RF sputtering in the order named to prepare a magneto-optical information storage medium having a structure shown in FIG. 2.

The recording layer had a Curie temperature of 180° C., a compensation temperature of 110° C., a coercive force of 7.3 kOe at room temperature, and magnetization of 170 emu/cc at room temperature. The bias layer had a coercive force of 2.4 kOe at room temperature, and magnetization of 180 emu/cc at room temperature. In this case, no compensation temperature was present between room temperature and 400° C.

An overwrite test using one-beam power modulation was performed at a linear speed of 10 m/sec, a recording power of 10 mW, an erase power of 6.5 mW, and a pulse width of 100 nsec while an external magnetic field of 400 Oe was kept applied in a direction of a leakage magnetic field applied from the bias layer to the recording layer. In this test, a 2-MHz new recording signal was recorded in the medium in which a 1-MHz recording signal was recorded. As a result, the previous 1-MHz information was erased, and only the new 2-MHz information was recorded. That is, the one-beam overwrite operation could be confirmed.

EXAMPLE 4

A temperature distribution of a beam-irradiated portion was obtained by arithmetic operations, when a magneto-optical information storage medium having a 1.2-mm thick quartz substrate, a 100-nm thick Si-N underlaying layer, a 25-nm thick $Tb_{28}(Fe_{0.85}Co_{0.15})_{72}$ recording layer, a 20-nm thick Si-N intermediate layer, a 200-nm thick $Tb_{22}Co_{78}$ bias layer, and a 100-nm thick Si-N protective layer was irradiated with a laser beam pulse having a spot diameter of 1.35 μm, a power 8 mW, and pulse width of 50 nsec. The temperature at the center of the region was calculated to be 216° C. immediately after the region has been irradiated by the laser beam. Also, the radius $\sigma$ of that part of the region, whose periphery was heated to 216° C.$\times e^{-2}$, was board, by calculation, to be 580 nm.

When 30 nanoseconds elapsed after radiation of a laser beam pulse having the above spot diameter, a power of 14.6 mW and a pulse width of 50 nsec, the central temperature was calculated to be 216° C. but the radius $\sigma$ was calculated as 750 nm, thus confirming a broad temperature distribution.

In the above calculation, the intensitizes which the leakage magnetic fields $H_B$ applied from the bias layers had at the centers of the beam spots and at the center along the thickness of the recording layer were obtained by arithmetic calculations to be 543 Oe and 454 Oe respectively, thus causing a difference of 89 Oe. It was thus confirmed that recording/erasure of information could be performed on the basis of the principle of the present invention.

EXAMPLE 5

Leakage magnetic field $H_B$ differences for the temperature distributions of the two irradiated portions obtained the same procedures as in Example 4 by using a magneto-optical information storage medium as in Example 4 were calculated at positions which were away from the bias layer to the recording layer by distances of 12.5 nm, 62.5 nm, and 112.5 nm and all of which corresponded to the beam spot center. These distances corresponded to thicknesses of 0 nm, 50 nm, and 100 nm of the intermediate layer when the thickness of the recording layer was set to be 25 nm. The $H_B$ differences were obtained, by calculation, to be 100 Oe, 69 Oe, and 52 Oe.

EXAMPLE 6

$H_B$ differences at the beam spot centers and at the center along the thickness of the recording layer were calculated for the temperature distributions of two irradiated portions obtained the same procedures as in Example 4 changing the thickness of the bias layer. When the thicknesses of the bias layer were set to be 50 nm, 100 nm, and 400 nm, the $H_B$ differences were 32 Oe, 52 Oe, and 106 Oe, respectively.

EXAMPLE 7

A 100-nm thick Si-N underlaying layer, a 25-nm thick $(Gd_{0.5}Tb_{0.5})_{15}Fe_{85}$ recording layer, a 10-nm thick Si-N intermediate layer, a 400-nm thick $Tb_{22}Co_{78}$ bias layer, and a 100-nm thick Si-N protective layer were formed on a tracking-grooved glass substrate having a diameter of 5.25 inch by way of RF sputtering in the order named to prepare a magneto-optical recording medium having a structure shown in FIG. 2.

The C/N ratio of the recording layer was changed from 0 dB to 48 dB with a magnetic field of ±50 Oe. According to arithmetic calculation, it was confirmed that the $H_B$ difference of 110 Oe was generated in the bias layer at the center of the laser beam spot.

An overwrite test using one-beam power modulation was performed at a linear speed of 10 m/sec, a recording power of 9 mW, and an erase power of 4.5 mW while an external magnetic field of 700 Oe was applied in a direction of a leakage magnetic field applied from the recording layer. In this test, a 2-MHz new recording signal was recorded in the medium in which a 1-MHz recording signal was recorded. As a result, the previous 1-MHz information was erased, and only the new 2-MHz information was recorded. That is, the one-beam overwrite operation could be confirmed.

What is claimed is:
1. A magneto-optical recording medium comprising:
   a recording layer for recording information; and
   a bias layer for applying a bias magnetic field to the recording layer, said recording and bias layers having perpendicular magnetic anisotropy and being stacked one above the other such that coupling interaction which is predominantly magneto- static interaction acts therebetween, said medium being irradiated with modulated laser beam pulses having a first level and a second level lower than the first level so as to record/erase the information, wherein the medium satisfies condition $T_1 > T_2 > T_{rR}$ where $T_{rR}$ is a magnetization reversing temperature of the recording layer, $T_1$ is a temperature of a region irradiated with the laser beam having the first level, and $T_2$ is a temperature of a region irradiated with the laser beam having the second power level, and satisfies condition $H_{CR}(T_{rR}) \leq H_{S1} - H_{B1}$ (where $H_{B1}$ is a leakage magnetic field leaking from the bias layer and applied to the recording layer and $H_{S1}$ is a self-leakage magnetic field leaking from the recording layer, both $H_{B1}$ and $H_{S1}$ being values obtained when the medium is cooled from the temperature $T_1$ to the temperature $T_{rR}$, and $H_{CR}(T_{rR})$ is a coercive force of the recording layer at the temperature $T_{rR}$) when the recording and bias layers are cooled from the temperature $T_1$ to the temperature $T_{rR}$ and condition $H_{CR}(T_{rR}) \leq H_{B2} - H_{S2}$ (where $H_{B2}$ is a leakage magnetic field leaking from the bias layer and applied to the recording layer and $H_{S2}$ is a self-leakage magnetic field leaking from the recording layer, both $H_{B2}$ and $H_{S2}$ being values obtained when the medium is cooled from the temperature $T_2$ to the temperature $T_{rR}$, and $H_{CR}(T_{rR})$ is a coercive force of the recording layer at the temperature $T_{rR}$) when the recording and bias layers are cooled from the temperature $T_2$ to the temperature $T_{rR}$.

2. A medium according to claim 1, wherein the medium satisfies condition $T_{compB} < T_c$ where $T_{compB}$ is a compensation temperature of the bias layer and $T_c$ is a Curie temperature of the recording layer.

3. A medium according to claim 2, wherein the medium satisfies condition $T_{rR} > T_{compB}$.

4. A medium according to claim 1, wherein the recording layer has a Curie temperature near $T_{rR}$ and does not have a compensation temperature falling between room temperature and the Curie temperature.

5. A medium according to claim 1, wherein the recording layer has a compensation temperature $T_{compR}$ and satisfies condition $T_{rR} > T_{compR}$.

6. A medium according to claim 1, wherein the recording and bias layers contain an amorphous rare earth-transition metal alloy.

7. A medium according to claim 1, further comprising an intermediate layer made of a dielectric material and sandwiched between the recording and bias layers.

8. A method of magneto-optically recording and erasing information comprising the steps of:
 providing a magneto-optical information storage medium including magnetic recording and bias layers which are stacked one upon the other wherein the medium provided predominant magnetostatic interaction between the layers, said medium satisfying the conditions: T1 is a temperature of pulse-like laser light irradiated region on the medium heated with a first laser power level, T2 is a temperature of a pulse-like laser light irradiated region on the medium heated with a second laser power level lower than the first power level, $H_{cR}(TrR) < HS1 - HB1$ when the recording and bias layer are cooled from the temperature T1 to the temperature TrR, wherein TrR is a magnetic inversion temperature of the recording layer,
 wherein HB1 is a leakage magnetic field leaking from the bias layer which is applied to the recording layer and HS1 is the self-leakage magnetic field leaking from the recording layer, both the HS1 and HB1 being values obtained when the medium is cooled from the temperature T1 to the temperature TrR, wherein HB2 is a leakage magnetic field leaking from the bias layer which is applied to the recording layer, HS2 is a self-leakage magnetic field leaking from the recording layer, both HB2 and HS2 being values when the medium is cooled from the temperature T2 to the temperature TrR and wherein HCR(TrR) is a coercive force of the recording layer at the temperature TrR:
 irradiating the medium with said pulse-like laser beam having said higher first power level to said temperature T1 and then cooling the irradiated region from said temperature T1 to said temperature TrR to orient the magnetization direction in the recording layer in the direction of the self-leakage magnetization leaking from the recording layer;
 irradiating said irradiated region by said first higher power level beam with said pulse-like laser beam having said lower second power level to said temperature T2 and then cooling the irradiated region from said temperature T2 to the temperature TrR to orient the magnetization direction of the recording layer at the irradiated region in the direction of the leakage magnetic field leaking from the bias layer which is applied to the recording layer.

9. A method according to claim 8, further comprising the step of applying an external magnetic field $H_e$ in directions of the magnetic fields $H_{S1}$ and $H_{S2}$ so as to satisfy conditions $H_{CR}(T_{rR}) \leq H_{S1} + H_e - H_{B1}$ and $H_{CR}(T_{rR}) \leq H_{B2} - (H_{S2} + H_e)$.

10. A method according to claim 8, further comprising the step of applying an external magnetic field $H_e$ in directions of the magnetic fields $H_{B1}$ and $H_{B2}$ so as to satisfy conditions $H_{CR}(T_{rR}) \leq H_{S1} - (H_{B1} + H_3)$ and $H_{CR}(T_{rR}) \leq H_{B2} + H_e - H_{S2}$.

* * * * *